(12) United States Patent
Mester et al.

(10) Patent No.: US 9,584,170 B2
(45) Date of Patent: Feb. 28, 2017

(54) BROADBAND SUPERHETRODYNE RECEIVER WITH AGILE INTERMEDIATE FREQUENCY FOR INTERFERENCE MITIGATION

(71) Applicant: FreeWave Technologies, Inc., Boulder, CO (US)

(72) Inventors: Timothy G. Mester, Longmont, CO (US); Steven E. McMeekin, Evergreen, CO (US); Gregory J. Veintimilla, Boulder, CO (US)

(73) Assignee: FreeWave Technologies, Inc., Boulder, CO (US)

( * ) Notice: Subject to any disclaimer, the term of this patent is extended or adjusted under 35 U.S.C. 154(b) by 0 days.

(21) Appl. No.: 14/924,248

(22) Filed: Oct. 27, 2015

(65) Prior Publication Data

US 2016/0126988 A1 May 5, 2016

Related U.S. Application Data

(60) Provisional application No. 62/072,244, filed on Oct. 29, 2014.

(51) Int. Cl.
*H04B 1/10* (2006.01)
*H04B 1/26* (2006.01)
*H04B 1/28* (2006.01)

(52) U.S. Cl.
CPC .............. *H04B 1/10* (2013.01); *H04B 1/109* (2013.01); *H04B 1/26* (2013.01); *H04B 1/28* (2013.01)

(58) Field of Classification Search
CPC .................................. H04B 1/10; H04B 1/26
USPC ....................................................... 375/350
See application file for complete search history.

(56) References Cited

U.S. PATENT DOCUMENTS

| 5,488,632 | A | 1/1996 | Mason et al. | |
|---|---|---|---|---|
| 7,359,311 | B1 | 4/2008 | Paranjpe et al. | |
| 8,787,873 | B1 | 7/2014 | Hitt et al. | |
| 2002/0146994 | A1* | 10/2002 | Marrah | H04B 1/1646 |
| | | | | 455/276.1 |
| 2006/0074558 | A1* | 4/2006 | Williamson | G01C 21/165 |
| | | | | 701/469 |
| 2006/0256884 | A1 | 11/2006 | Tomioka et al. | |
| 2008/0089443 | A1 | 4/2008 | Sanada et al. | |
| 2016/0127009 | A1 | 5/2016 | McMeekin et al. | |
| 2016/0127110 | A1 | 5/2016 | McMeekin et al. | |
| 2016/0127953 | A1 | 5/2016 | McMeekin et al. | |
| 2016/0128010 | A1 | 5/2016 | McMeekin et al. | |

* cited by examiner

*Primary Examiner* — Tanmay Shah

(57) ABSTRACT

A broadband superheterodyne receiver. Embodiments include an input for receiving an RF signal including an RF data signal at a carrier frequency. An RF mixer coupled to the input shifts the RF data signal from the carrier frequency to an IF frequency. An IF band pass filter coupled to the mixer has a pass band, and band pass filters the signal near the IF frequency. A spectrum analyzer provides information representative of the spectral characteristics of the received RF signal around the RF data signal at the carrier frequency. An IF controller is coupled to the RF mixer and to the spectrum analyzer. The IF controller: (1) determines an interference-mitigating IF frequency within the pass band of the band pass filter that will result in attenuation of undesired portions of the RF signal, and (2) controls the RF mixer to shift the RF data signal to the interference-mitigating IF frequency.

14 Claims, 4 Drawing Sheets

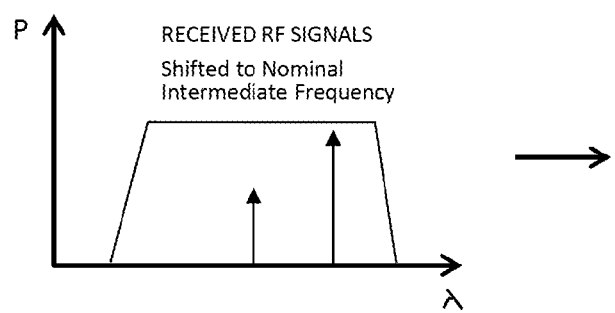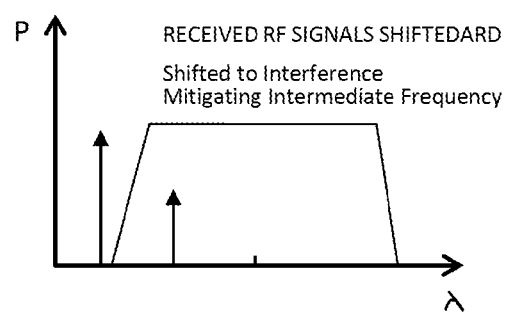
FIG.6A                    FIG.6B

US 9,584,170 B2

BROADBAND SUPERHETERODYNE RECEIVER WITH AGILE INTERMEDIATE FREQUENCY FOR INTERFERENCE MITIGATION

CROSS REFERENCE TO RELATED APPLICATION

This application claims the benefit of U.S. Provisional Application Ser. No. 62/072,244 filed on Oct. 29, 2014 and entitled Broadband Superheterodyne Receiver With Agile Intermediate Frequency For Interference Mitigation, which is incorporated herein by reference in its entirety and for all purposes.

BACKGROUND

Wireless communication systems are known and commercially available. So-called broadband receivers that can operate over a wide range of radio frequencies (RF) can be configured as superheterodyne receivers using an intermediate frequency (IF) section. In some applications, receivers of these types may be subject to interference from undesired RF signals having frequency content near the frequencies of the desired RF signals. There is a continuing need for receiver structures and methods of operation that mitigate interference from undesired signals.

SUMMARY

Embodiments of the invention include a broadband superheterodyne receiver. Embodiments of the receiver include an input for receiving an RF signal including an RF data signal at a carrier frequency, an RF mixer coupled to the input to shift the RF data signal from the carrier frequency to an IF frequency, and an IF band pass filter coupled to the mixer. The band pass filter has a pass band, and band pass filters the signal near the IF frequency. A spectrum analyzer provides information representative of the spectral characteristics of the received RF signal around the RF data signal at the carrier frequency. An IF controller is coupled to the RF mixer and to the spectrum analyzer. The IF controller: (1) determines an interference-mitigating IF frequency within the pass band of the band pass filter that will result in attenuation of undesired portions of the RF signal, and (2) controls the RF mixer to shift the RF data signal to the interference-mitigating IF frequency.

BRIEF DESCRIPTION OF THE DRAWINGS

FIGS. 6A and 6B are frequency domain graphs of exemplary signals at (1) a nominal intermediate frequency and (2) shifted and inverted to an interference-mitigating intermediate frequency in accordance with embodiments of the invention.

DESCRIPTION OF THE INVENTION

Figure 1:
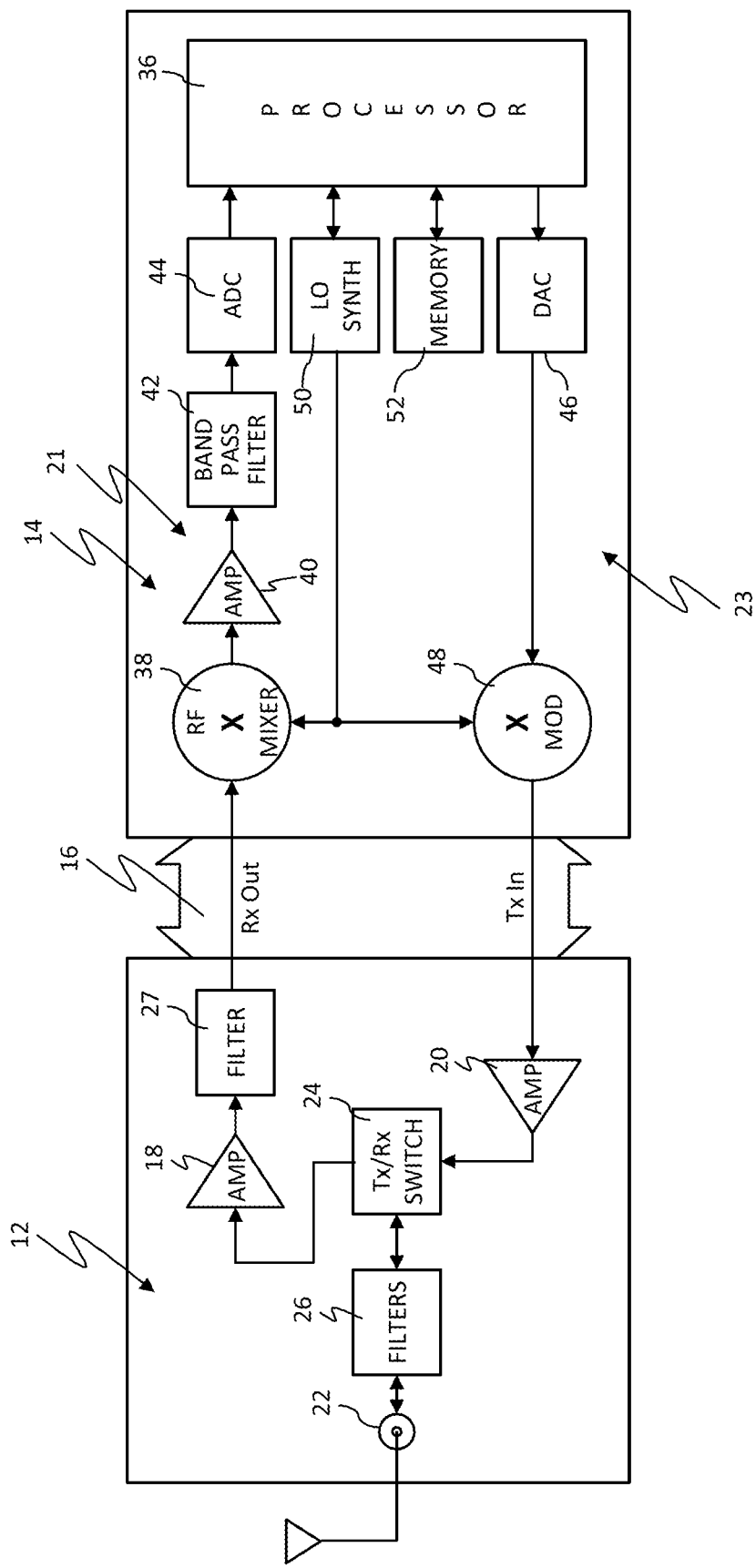
FIG. 1 is a diagrammatic block diagram of a broadband transceiver including an RF front end and modem module in accordance with embodiments of the invention.

FIG. 1 is a diagrammatic illustration of a superheterodyne broad band transceiver 10 with a receiver having an agile intermediate frequency for interference mitigation in accordance with embodiments of the invention. As shown, transceiver 10 includes a radio frequency (RF) front end (RFFE) 12 coupled to modem module (MM) 14 by a connector 16. One embodiment of transceiver 10 is configured as a time division multiple access (TDMA) radio that operates at one of a wide range of carrier frequencies such as 100 MHz-6 GHz, and channel bandwidths such as 6.25 KHz-10 MHz. Other embodiments of the invention operate at other frequency bands, other channel bandwidths and/or at multiple carrier frequencies, and can be configured with other physical layers and hardware structures. Wireless communications between transceivers 10 can be organized into sequential frames. Each frame includes a time division duplexed (TDD) downlink portion and an uplink portion that are separated in time by a guard interval. One (e.g., a first) transceiver transmits data during the downlink portions of the frames, and another (e.g., a second) transceiver communicating with the first transceiver by the communication frames transmits data intended for the first transceiver during the uplink portions of the frames. One or more suitable modulation schemes such as, for example, FSK (frequency shift keying), QPSK (quadrature phase shift keying), 16QAM (quadrature amplitude modulation) and 64QAM, and multicarrier schemes such OFDM (orthogonal frequency division multiplexing) and OFDMA (orthogonal frequency division multiple access) can be used. In embodiments, the transceiver 10 can dynamically select modulation schemes based on factors such as desired data transmission rates, available channel bandwidth and interference levels. Applications of transceivers 10 include, for example, oil and gas field management, water and wastewater management, location tracking and machine-to-machine (M2M) applications. Other embodiments of the invention are configured with other channel access methods such as code division multiple access (CDMA) and frequency division multiple access (FDMA).

The RFFE 12 of the illustrated embodiment is configured for operation at specific carrier frequency bands, and the MM 14 is configured for wide band operation with any of the carrier frequency-specific RFFEs. Accordingly, the RFFE 12 includes band-specific receive (Rx) and transmit (Tx) low noise amplifier 18 and power amplifier 20, respectively, coupled to an antenna terminal 22 through a receive/transmit (Rx/Tx) switch 24. RFFE 12 can also include band-specific filters such as those shown at 26 and 27. Although only the receiver output from (Rx Out) and transmitter input to (Tx In) the RFFE 12 are expressly shown, other signal connections to the RFFE (e.g., a control signal to the receive/transmit switch 24) are coupled between the RFFE and MM 14 by the connector 16.

MM 14 includes a receiver section 21, a transmitter section 23, and processor 36. The receiver section 21 is a superheterodyne receiver and includes an RF mixer 38, an intermediate frequency (IF) stage 39 that includes in the illustrated embodiment intermediate frequency amplifier 40 and band pass filter 42, and analog-to-digital converter (ADC) 44. Transmitter section 23 includes digital-to-analog converter (DAC) 46 and IQ modulator 48. The RF mixer 38 and modulator 48 are driven by a local oscillator (LO) synthesizer 50 that is coupled to the processor 36 in the illustrated embodiment. Processor 36, which is a digital signal processor (DSP) in embodiments, is coupled to memory 52. Data defining the specific functions and sub-processes implemented by the processor 36, including control and signal processing programs and algorithms, as well as data or other information generated or used by the processor, can be stored in memory 52. As discussed further below, RF mixer 38 shifts the carrier frequency of the received RF signal to an intermediate frequency. The received signal at the intermediate frequency is then modified or processed by the IF stage 39 before applied to the ADC 44. In one embodiment of the invention the intermediate frequency is nominally 140 MHz, and the received RF signals are band pass filtered by a band pass filter 42 having a pass band of about 10 MHz. Other intermediate frequencies and pass bands are used in other embodiments. In addition to the agile IF/interference mitigation functionality described in greater detail below, processor 36 performs other receive signal processing, transmit signal processing and control functions. For example, the processor 36 performs an IF mixer function to shift the digital signal from the intermediate frequency to the channel base band, and demodulate those signals. Base band transmit signals produced by the processor 36 are converted to analog form by DAC 46 and modulated onto the carrier by IQ modulator 44. The modulated RF transmit signals are then outputted to the RFFE 12 for transmission.

Figure 2:
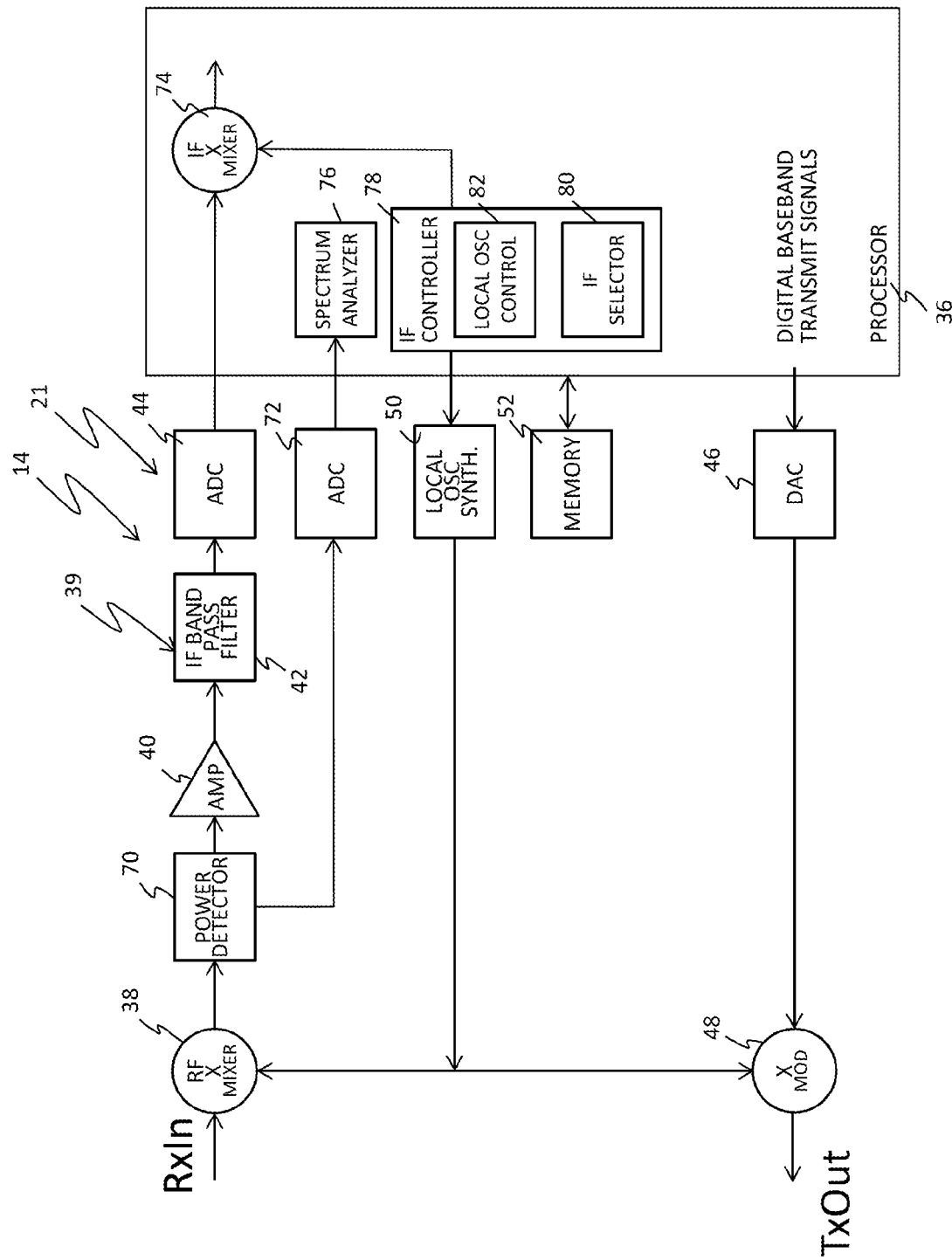
FIG. 2 is a more detailed block diagram of portions of the modem module of FIG. 1 in accordance with embodiments of the invention.

FIG. 2 is a more detailed diagrammatic illustration of a modem module 14, showing additional functional components that cooperate with other components of the modem module and its processor 36 to perform agile IF/interference mitigation in accordance with embodiments of the invention. As shown, a power detector 70 monitors and provides information representative of the power levels (e.g., RMS levels) of the received signals. In the embodiment shown in FIG. 2, the power detector 70 is an analog device in the receiver section 21, between the RF mixer 38 and amplifier 40, and the monitored power output signal is coupled to the processor 36 through an ADC 72. The power level of the receive signals can be monitored or determined at other locations in other embodiments (not shown). Processing and control functionality of processor 36 includes IF mixer 74, spectrum analyzer 76 and IF controller 78. Spectrum analyzer 76, which can include a Fourier transformer (not separately shown), performs a Fourier transform on the monitored power output signals, and generates spectral information such as strength, frequencies, phase and temporal content (i.e., the timing) of the received RF signals. Information produced by the spectrum analyzer 76 is coupled to the IF controller 78. As described in greater detail below, the IF controller 78 produces control signals that are coupled to the local oscillator synthesizer 50 and the IF mixer 74.

Figure 3:
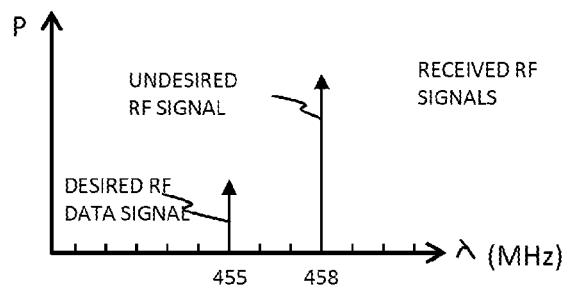
FIG. 3 is a frequency domain graph of exemplary RF signals, including a desired RF data portion and an undesired RF interfering signal portion, that may be received and processed by the receiver shown in FIG. 2.

Transceiver 10 operates with an agile or dynamic intermediate frequency to mitigate interference with undesired RF signals. RF signals received by the RFFE 12 and coupled to the MM 14 may include RF signals intended for receipt by the transceiver (the "desired RF signals"). The desired RF signals transmitted for receipt by transceiver 10 will include data modulated over a channel bandwidth onto a carrier having a carrier frequency. The received RF signals may also include other signals that effectively constitute noise with respect to the desired RF signals (the "undesired RF signals"). The undesired RF signals received by the transceiver 10 may have frequency or spectral content at or near the channel bandwidth and carrier frequency of the desired RF signal. By way of example, FIG. 3 is a frequency domain illustration of the spectral content of a desired RF signal at 455 MHz and an undesired RF signal at 458 MHz received by the transceiver 10. As shown, the desired RF signal has relatively low power when received by the transceiver 10, since it may have been transmitted by a remote transmitter. The undesired RF signal may have been transmitted by a transmitter located near the transceiver 10, and may have a power level substantially greater than that of the desired RF signal.

As shown in FIG. 2, IF controller 78 includes IF selector 80 and local oscillator controller 82. The IF stage 39 of receiver section 21 is configured to operate at a nominal intermediate frequency, which can for example be 140 MHz. Other embodiments of the invention are configured to operate at other nominal intermediate frequencies. Band pass filter 42 has a frequency pass band that includes, and that in some embodiments is centered on, the nominal intermediate frequency of the receiver section 21. Continuing with the 140 MHz IF example above, embodiments of transceiver 10 include a band pass filter 42 having a 10 MHz pass band centered at 140 MHz. The pass band and center frequency of band pass filter 42 are different in other embodiments.

Figure 4:
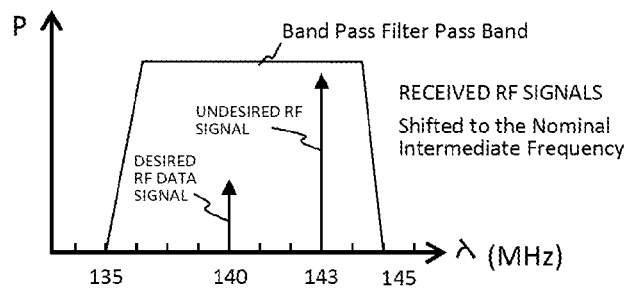
FIG. 4 is a frequency domain graph of the received signals shown in FIG. 3 after being shifted to a nominal intermediate frequency by the RF mixer of the receiver shown in FIG. 2.

IF controller 78 produces timing or other control signal that causes the local oscillator synthesizer 50 to drive the RF mixer 38 with an offset mixer signal having a frequency that will shift the center (e.g., carrier) frequency of the desired RF signal to an intermediate frequency that is selected or otherwise determined by the IF selector 80. Continuing with the example above, to shift the 455 MHz desired RF signal to the 140 MHz nominal intermediate frequency, the IF controller 78 can cause the local oscillator synthesizer 50 to produce a 315 MHz mixer signal. FIG. 4 is an illustration of the desired RF signal shifted to the 140 MHz intermediate frequency by the RF mixer 38. Operation of the RF mixer 38 in this manner also frequency shifts all the other spectral components of the RF signal input to the mixer by a similar amount. Accordingly, following the above example, FIG. 4 shows the undesired 458 MHz RF signal shifted to 143 MHz.

As shown in FIG. 2, the portions of the IF signal passed through the pass band filter 42 are amplified by amplifier 24 and applied to ADC 44. The digital IF signal produced by ADC 44 is applied to IF mixer 24, which demodulates the signals to recover the base band data signals in the digital IF signal. As shown, the IF mixer 74 is driven by an IF mixer offset signal produced by IF controller 78. The IF mixer offset signal will be at the same frequency as the intermediate frequency of the signal produced by the RF mixer 38. Following the example above using a nominal 140 MHz intermediate frequency, the IF controller 38 will produce a 140 MHz mixer offset signal. The digital base band receive data signals produced at the output of the IF mixer 74 can be further processed and used in known or otherwise conventional manners.

ADC 44 is sensitive to the power levels of the signals applied to its input. In particular, it is advantageous to prevent saturation of the ADC 44 by the input signals. In the example described above in connection with FIG. 4, the signals applied to ADC 44 include the undesired IF signal at 143 MHz. That undesired signal, particularly because of its relatively high power level, can interfere with the operation of ADC 44 and subsequent processing (including demodulation) of the desired signal. Transceiver 10 is configured to operate in a manner that manages or mitigates the effects of the presence of the undesired RF signals at or near the frequency of the desired RF signal.

The IF selector 80 of IF controller 78 processes the spectral characteristic information received from spectrum analyzer 76, and selects or otherwise determines interference-mitigating IF frequencies within the pass band of the band pass filter 42 that will result in attenuation of undesired portions of the RF signal. These functions of the IF selector 80 can be performed using any suitable approach. Following the example above, IF selector 80 can identify the undesired signal at 143 MHz, and/or determine that the power content of this undesired signal can be attenuated without substantially impacting the desired signal at 140 MHz if the IF section 39 is operated at an intermediate frequency other than 140 MHz within the pass band of the band pass filter 42 that also causes the undesired signal to be shifted outside of the pass band of the band pass filter. After IF selector 30 determines a suitable interference-mitigating intermediate frequency, local oscillator controller 82 provides control signals to the local oscillator synthesizer 50 that will cause the IF section 39 to operate at the selected intermediate frequency. The local oscillator controller 82 will also cause the IF controller 78 to produce the appropriate IF mixer offset signal to operate IF mixer 74 at the selected intermediate frequency to properly demodulate the desired IF signals.

Figure 5:
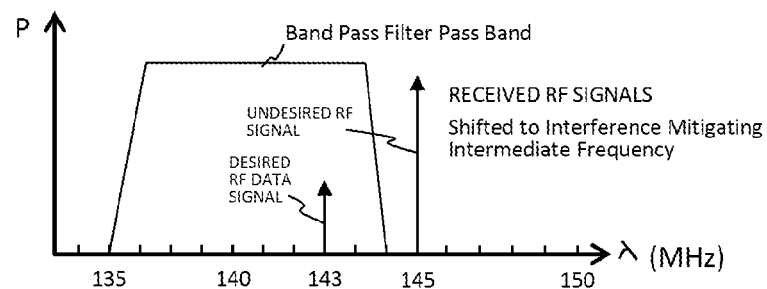
FIG. 5 is a frequency domain graph of the signals shown in FIG. 4 after being shifted to an interference-mitigating intermediate frequency by the RF mixer of the receiver shown in FIG. 2.

By way of example, and continuing with the example above, one suitable intermediate frequency the IF selector 30 can identify to achieve the interference mitigating effects described above is 143 MHz. FIG. 5 is an illustration of the signals produced by RF mixer 38 when the IF stage 39 is configured to operate at an intermediate frequency of 143 MHz. As shown, the desired signal is still located within the pass band of the band pass filter 42, but the undesired signal is shifted (upwardly in frequency) to a frequency of 146 MHz that is outside of the pass band of the band pass filter. The undesired signal portion will thereby be substantially attenuated before the signal is applied to ADC 44. In other embodiments, the IF stage 39 can be configured to operate in a manner that will shift the frequency of undesired signal portions downward, below and outside of the pass band of the band pass filter 42. In still other embodiments, the RF mixer 38 can be driven in such a manner as to invert the relationship of undesired signal portions with respect to the desired signal, either alone or in combination with an increased or decreased frequency shift as described above, to move the undesired signal portion out of the pass band of the band pass filter 42. Operation of transceiver 10 in this manner is illustrated by FIGS. 6A and 6B.

Although the invention has been described with reference to preferred embodiments, those of skill in the art will recognize that changes can be made in form and detail without departing from the spirit and scope of the invention. By way of non-limiting examples, techniques described herein may be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. CDMA may be embodied by radio technology such as universal terrestrial radio access (UTRA) or CDMA2000. TDMA may be embodied by radio technology such as global system for mobile communications (GSM)/general packet radio service (GPRS)/enhanced data rates for GSM evolution (EDGE). OFDMA may be embodied by radio technology such as IEEE 802.11 (Wi-Fi), IEEE 802.16 (WiMAX), IEEE 802-20, evolved UTRA (E-UTRA), Bluetooth, Zigbee, 802.15.4, etc.

The invention claimed is:

1. A broadband superheterodyne receiver, comprising:
   an input for receiving an RF signal including an RF data signal at a carrier frequency;
   an RF mixer coupled to the input, to shift the RF data signal from the carrier frequency to an IF frequency;
   an IF band pass filter coupled to the mixer, wherein the band pass filter has a pass band, to band pass filter the signal near the IF frequency;
   a spectrum analyzer to provide information representative of the spectral characteristics of the received RF signal around the RF data signal at the carrier frequency; and
   an IF controller coupled to the RF mixer and to the spectrum analyzer, to: (1) determine an interference-mitigating IF frequency within the pass band of the band pass filter that will result in attenuation of undesired portions of the RF signal, and (2) control the RF mixer to shift the RF data signal to the interference-mitigating IF frequency.

2. The receiver of claim 1, wherein:
   the receiver further includes an IF mixer coupled to receive the band pass filtered IF signal and to demodulate the IF signal; and
   the IF controller is coupled to the IF mixer and causes the IF mixer to demodulate the IF signal at the interference-mitigating IF frequency.

3. The receiver of claim 2, wherein:
   the receiver further includes an ADC coupled to the band pass filter, to convert the IF signal at the interference-mitigating IF frequency to digital form;
   the IF mixer is a digital mixer, optionally implemented in a processor including a digital signal processor.

4. The receiver of claim 1 wherein:
   the band pass filter has a center frequency, and
   the IF control system selects an interference-mitigating IF frequency that is above or below the center frequency of the band pass filter to shift undesired spectral portions of the RF signal outside of the pass band of the band pass filter.

5. The receiver of claim 1 wherein the IF controller controls the RF mixer in such a manner as to invert the frequency spectrum of the RF signal.

6. The receiver of claim 1 and further including a detector, optionally a power detector, for providing information representative of the received RF signal to the spectrum analyzer.

7. The receiver of claim 6 wherein the detector is coupled to receive the IF frequency signal.

8. The receiver of claim 1 and further including a local oscillator synthesizer coupled between the IF controller and the RF mixer.

9. The receiver of claim 1 wherein the IF controller includes one or both of a local oscillator controller and an IF selector.

10. A method for mitigating interference in a superheterodyne receiver, including:
    band pass filtering a received signal at an IF stage; and
    operating an RF mixer to shift the received signal to a determined interference-mitigating intermediate frequency in such a manner as to cause undesired portions of the received signal to be attenuated by the band pass filtering while passing desired portions of the received signal.

11. The method of claim 10 wherein operating the RF mixer to cause undesired portions of the received signal to be attenuated includes:

identifying undesired portions of the received signal; and selecting an intermediate frequency that will cause the identified undesired portions of the received signal to be filtered out during the band pass filtering.

12. The method of claim 11 wherein operating the RF mixer includes one or more of shifting the intermediate frequency with respect to a nominal intermediate frequency, and inverting the frequency of the undesired portions of the received signal with respect to desired portions of the received signal.

13. The method of claim 12 wherein selecting an intermediate frequency includes selecting an intermediate frequency that is within a pass band during the band pass filtering.

14. The method of claim 13 and further including demodulating the band pass filtered desired portions of the receive signal at the selected intermediate frequency.

* * * * *